(12) United States Patent
Studeny et al.

(10) Patent No.: US 11,347,184 B2
(45) Date of Patent: May 31, 2022

(54) METHOD AND APPARATUS FOR GENERATING IMAGE EFFECTS IN THE INTERIOR OR OUTSIDE OF A VEHICLE

(71) Applicant: VOLKSWAGEN AKTIENGESELLSCHAFT, Wolfsburg (DE)

(72) Inventors: Christian Studeny, Braunschweig (DE); Nils Pfullmann, Hannover (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 192 days.

(21) Appl. No.: 16/332,096

(22) PCT Filed: Aug. 8, 2017

(86) PCT No.: PCT/EP2017/070013
§ 371 (c)(1),
(2) Date: Mar. 11, 2019

(87) PCT Pub. No.: WO2018/050362
PCT Pub. Date: Mar. 22, 2018

(65) Prior Publication Data
US 2020/0183328 A1 Jun. 11, 2020

(30) Foreign Application Priority Data
Sep. 13, 2016 (DE) .......................... 102016217398.7

(51) Int. Cl.
*G03H 1/22* (2006.01)
*F21S 43/251* (2018.01)
(Continued)

(52) U.S. Cl.
CPC ........... *G03H 1/2202* (2013.01); *B60K 35/00* (2013.01); *B60Q 1/0011* (2013.01); *B60Q 1/50* (2013.01);
(Continued)

(58) Field of Classification Search
CPC ........ B60K 2370/785; B60K 2370/166; B60K 35/00; B60K 2370/29; B60K 2370/333;
(Continued)

(56) References Cited

U.S. PATENT DOCUMENTS

| 4,790,613 | A |   | 12/1988 | Moss |            |
|-----------|---|---|---------|------|------------|
| 4,892,369 | A | * | 1/1990  | Moss | B60Q 1/302 |
|           |   |   |         |      | 359/15     |

(Continued)

FOREIGN PATENT DOCUMENTS

| DE | 4102571 A1 | 8/1991  |
| DE | 4411440 A1 | 10/1994 |

(Continued)

*Primary Examiner* — Audrey Y Chang
(74) *Attorney, Agent, or Firm* — Laurence A. Greenberg; Werner H. Sterner; Ralph E. Locher (57) ABSTRACT

A method and an illumination arrangement for generating image effects in the interior of a motor vehicle or also outside the motor vehicle. To use existing installation space as efficiently as possible, light is radiated, in the form of at least a first optical reference wave field, onto a irradiation surface that is arranged laterally on an optical image storage device. In the optical image storage, which contains a holographic layer or a diffractive optical layer, the optical reference wave field is transformed into at least a first image wave field and is emitted on an emission side, at a first angular offset with respect to the irradiation surface.

9 Claims, 9 Drawing Sheets

(51) Int. Cl.
*F21S 43/239* (2018.01)
*F21S 43/245* (2018.01)
*B60K 35/00* (2006.01)
*B60Q 1/00* (2006.01)
*B60Q 1/50* (2006.01)
*G02B 27/01* (2006.01)

(52) U.S. Cl.
CPC ............ *F21S 43/239* (2018.01); *F21S 43/245* (2018.01); *F21S 43/251* (2018.01); *G02B 27/0103* (2013.01); *B60K 2370/178* (2019.05); *B60K 2370/29* (2019.05); *B60K 2370/333* (2019.05); *B60K 2370/334* (2019.05); *B60K 2370/785* (2019.05); *B60K 2370/797* (2019.05); *G02B 2027/0105* (2013.01); *G03H 2001/2226* (2013.01); *G03H 2001/2234* (2013.01); *G03H 2223/16* (2013.01); *G03H 2223/24* (2013.01)

(58) Field of Classification Search
CPC ...... B60K 2370/334; G02B 2027/0105; G03H 2001/2226; G03H 2001/2234; G03H 2223/16; G03H 2223/24; G03H 1/2202; B60Q 2400/50; B60Q 1/0058; B60Q 1/2607; B60Q 1/302; B60Q 1/0011; B60Q 1/50; F21S 43/251; F21S 43/239; F21S 43/245
USPC ............................ 359/13, 34, 24, 15; 362/80
See application file for complete search history.

(56) References Cited

U.S. PATENT DOCUMENTS

| | | | |
|---|---|---|---|
| 4,916,593 A | | 4/1990 | Moss et al. |
| 5,106,174 A | | 4/1992 | Smith |
| 5,186,533 A | | 2/1993 | Hori |
| 5,634,708 A | * | 6/1997 | Koie ...................... B60Q 1/302 362/503 |
| 5,708,519 A | | 1/1998 | Yamamoto et al. |
| 5,711,592 A | * | 1/1998 | Hotta .................... F21S 43/237 362/496 |
| 5,729,367 A | * | 3/1998 | Smith ...................... G03H 1/26 359/24 |
| 2004/0113053 A1 | | 6/2004 | Michenfelder et al. |
| 2005/0002074 A1 | * | 1/2005 | McPheters ........... G03H 1/0005 359/15 |
| 2009/0113775 A1 | | 5/2009 | Netter |
| 2012/0262288 A1 | | 10/2012 | Moussa et al. |
| 2016/0107564 A1 | | 4/2016 | Sola Gomfaus et al. |

FOREIGN PATENT DOCUMENTS

| | | |
|---|---|---|
| DE | 20001311 U1 | 4/2000 |
| DE | 102006050548 A1 | 4/2008 |
| DE | 102011012520 A1 | 8/2012 |
| DE | 102014210213 A1 | 12/2014 |
| DE | 202013008540 U1 | 1/2015 |
| DE | 202014003241 U1 | 7/2015 |
| EP | 1055863 B1 | 9/2013 |
| JP | H03121942 A | 5/1991 |

* cited by examiner

METHOD AND APPARATUS FOR GENERATING IMAGE EFFECTS IN THE INTERIOR OR OUTSIDE OF A VEHICLE

BACKGROUND OF THE INVENTION

Field of the Invention

The invention relates to a method for generating image effects in the interior and/or outside a vehicle, an illumination arrangement for a vehicle and a motor vehicle with such an illumination arrangement. More specifically, the method for generating the image effects includes the steps of: generating at least a first optical reference wave field; directing the first optical reference wave field toward at least one optical image storage device; radiating the first optical reference wave field into at least one irradiation surface of the optical image storage device; transforming the first optical reference wave field into at least a first image wave field via at least one holographic layer or diffractive optical layer of the optical image storage device; and emitting the first image wave field from the holographic layer or diffractive optical layer at an emission side. The Illumination arrangement for a vehicle includes a first light source for generating at least a first optical reference wave field; an optical image storage device with at least a first irradiation surface, at least one holographic layer or diffractive optical layer, and an emission side; and a device for directing the first optical reference wave field toward the optical image storage device.

A general trend in vehicle development is to integrate an ever-greater number of functions into the same or an even smaller installation space. As regards the integration of functions, this trend particularly relates to the functional technical elements of the vehicle and their integration into the vehicle. One example of this is the integration of lighting functions in vehicles. In this context it is known in the art, for example, to use holograms and diffractive optical elements to generate complex image effects.

US 2004/0113053 A1 describes a sensor device for checking the lighting devices of a motor vehicle. A diffractive optical element, designed as a hologram, is attached to a window pane of the motor vehicle.

DE 20 2014 003 241 U1 additionally describes a holographic display device. This comprises a housing with a transparent cover and a holographic foil arranged inside the housing. A diffractive optical element is arranged below the holographic foil. In addition, a light source is arranged below the diffractive optical element.

U.S. Pat. No. 4,916,593 A discloses a brake light arrangement with a volume hologram. The volume hologram is arranged on the inside of a window of a motor vehicle.

DE 10 2011 012 520 A1 additionally discloses a third brake light for a motor vehicle. This brake light comprises a light source, a holographic-optical component and a light source. The holographic-optical component is arranged on the rear window of a motor vehicle.

Finally, DE 10 2014 210 213 A1 discloses a method for controlling a light emission of a rear lamp of a vehicle. The rear lamp in that case comprises optical components with different partial emission surfaces. Different light functions may be generated by means of the partial emission surfaces. The light functions are realized by simultaneous and/or time-shifted activation of the partial emission surfaces. The text also describes a corresponding apparatus for controlling light emission.

SUMMARY OF THE INVENTION

The object of the present invention is to provide a method and an apparatus for generating image effects in the interior or also outside a vehicle, by means of which existing installation space may be used efficiently and flexibly, while at the same time great flexibility is provided with regard to the image effects that may be generated.

The objective is achieved through the subject matter of the independent claims.

Preferred configurations of the invention may be derived from the other features mentioned in the dependent claims.

A first aspect of the invention relates to a method for generating image effects in the interior of a vehicle and/or outside the vehicle, comprising at least the steps of:

Generating at least a first optical reference wave field;

Directing the first optical reference wave field toward at least one optical image storage device;

Radiating the first optical reference wave field into at least one irradiation surface of the optical image storage device;

Transforming the first optical reference wave field into at least a first image wave field via at least one holographic layer or diffractive optical layer of the optical image storage device; and Emitting the first image wave field from the holographic layer or diffractive optical layer on an emission side.

According to the invention, it is contemplated that there is a first angular offset between a first irradiation surface, via which at least the first optical reference wave field is radiated, and the emission side, via which at least the first image wave field is outcoupled.

The generated image effects may be real images as well as virtual images. Holograms are an example of virtual images. Real images, for example, are projections onto a surface. A hologram may be generated for example in a vehicle window or in open space. For example, additional information may be displayed to a user of the vehicle in open space in the vehicle interior or outside the vehicle, as well as in the vehicle windows. Some examples are the display of warning symbols, lighting functions or navigation arrows. The same applies to an observer of the vehicle who observes the vehicle from the outside. In this case, for example, a warning symbol may be generated as a virtual image in the open space between the vehicle and the observer. One example of a real image is a carpet of light that is projected onto a road surface outside the vehicle.

As is known in the art, the nature of the optical reference wave field depends on the requirements of the respective image effect to be generated and the optical image storage device used. In general, the term "reference wave field" refers to a wave field that is capable of reconstructing or generating the image effect stored in the optical image storage device as an image wave field by exposing the optical image storage device to light. Preferably, this is a coherent wave field. As is known in the art, holograms are known to depend on the wave field used to record the hologram. At the outset, when recording the hologram, this reference wave field is divided. A first part reaches the object to be recorded and is reflected by the object as a reflection (object wave field). A second part is superimposed on the object wave field and directed together with it to the optical image storage device. The optical image storage device stores this superimposition. To reconstruct the hologram, the optical image storage device must then be illuminated again using the reference wave field. In the case of diffractive optical elements, it is known in the art that the image effect is in the form of spatial microstructures on or in the diffractive optical element. The reference wave field that is needed in order to generate the image effect is determined by the nature of these microstructures, which are designed to produce a specific reference wave field and modulate it with regard to its phase response or amplitude response. Depending on the nature of the microstructures, the reference wave field is therefore coherent, and preferably monochromatic or rectified.

The reference wave field is preferably always generated with a laser, and particularly preferably with a light-emitting diode.

The diffractive optical layer or holographic layer preferably have structures for transforming several reference wave fields into several image wave fields. In this context one also speaks of "multiplexing." The transformation of the optical reference wave field into the image wave field, which is then perceptible as an image effect, takes place preferably by transmitting the optical image storage device or at least temporarily by coupling into the optical image storage device. For this purpose, the optical image storage device has the irradiation surface. The emission side serves for emitting all image fields generated using the optical image storage device, irrespective of the irradiation surface on which these were fed to the optical image storage device. To clarify this point, the emission side is therefore also referred to below as the shared emission side; "emission side" and "shared emission side" refer to the same structural feature.

The method of the invention has the advantage that the optical reference wave field no longer has to be supplied to the optical image storage device from a given direction. In particular, the irradiation surface may also be furnished laterally on the optical image storage device; in that case, light may be deflected toward the structures within the optical image storage device for transformation. For example, the optical image storage device may comprise structures for deflecting light as well as light-transmissive areas. In this way, light, or the optical reference wave field, may penetrate the optical image storage device at almost any angular offset, may transmit it completely or partially, and may be deflected to the structures for deflecting light toward the emission side. The latter is done in a simple preferred exemplary embodiment at inner boundary surfaces of the optical image storage device by reflection or total reflection. In conventional solutions, however, the irradiation surface is arranged parallel to the emitting surface, so that the optical reference wave field must be either deflected before it reaches the irradiation surface or directly supplied to the optical image storage device in the direction of the irradiation surface. The structural effort is correspondingly high and there is correspondingly little flexibility in how the light sources and optical image storage device are arranged.

This invention eliminates these drawbacks. This results in a significantly increased ability to use existing installation space. In particular, this significantly increases flexibility in the relative arrangement of light sources and optical image storage device. With regard to the installation space, in particular, the method according to the invention also offers the advantage that light sources for generating one or more optical reference fields may be arranged almost arbitrarily relative to the optical image storage device without the need for additional optical components for deflecting the light emitted by the light sources. To this end, the angular offset between the irradiation surface and the emission side is selected accordingly. When arranging the light source relative to the irradiation surface, a person of skill in the art prefers to radiate the light onto the irradiation surface in the normal direction, in order to reduce losses due to reflection.

In a preferred configuration of the method of the invention, it is contemplated that at least a first optical reference wave field and second optical reference wave field are generated, and that both the first optical reference wave field at the first irradiation surface, and the second optical reference wave field at a second irradiation surface, are radiated onto the optical image storage device, and the first and second optical reference wave fields are transformed, either simultaneously or time-shifted, into the first image wave field or into different image wave fields, and the first image wave field or different image wave fields may be outcoupled at the emission side, which serves as a shared emission side.

To transform the first and second optical reference wave fields, the optical image storage device may, for example, comprise structures in which the transformation into the respective image wave field depends on the wavelength of the optical reference wave field or also depends on the arrangement of the irradiation surface associated with the respective optical reference wave field.

In this way, different image effects may advantageously be created with an optical image storage device in a flexible manner (keyword multiplexing). If the different image wave fields are generated simultaneously, different image effects may for example be integrated into each other. This allows, for example, superimposing image effects in different colors. If the different image fields are generated with a time-shift, this enables, for example, switching quickly from one image effect to another.

Another preferred configuration of the method of the invention contemplates that a first angular offset exists between the first irradiation surface and the emission side and that at least a second optical reference wave field is generated which is radiated onto at least a second irradiation surface, and that there is a second angular offset between the second irradiation surface and the emission side, which serves as a shared emission side. Preferably, at least the first angular offset or the second angular offset is 90° relative to the shared emission side. It is especially preferable that the first and second angles are offset by 90° relative to the shared emission side. Furthermore, the first and/or second optical reference wave field are preferably radiated orthogonally onto the respective first or second irradiation surface. It will be apparent to a person of skill in the art that this concept may also be applied to a multiplicity of optical reference fields and, if necessary, a multiplicity of irradiation surfaces. In other words, in the present embodiment, the optical reference wave fields are radiated laterally into the optical image storage device.

For example, in this case the irradiation surfaces may be furnished at the edges of the optical image storage device. For example, reflection at the inner boundary surfaces of the optical image storage device may cause the light to propagate in the interior of the optical image storage device. In that case, or in defined areas, the light may, for example, partially or completely pass through the emission side via an inner boundary surface that faces the shared emission side. For this purpose, the inner boundary surface may be light-transmissive in part and/or in sections.

This all offers advantages particularly with regard to the intensity and homogeneity of the image effects that are generated. In particular, intensity and homogeneity may be significantly improved by at least two-sided light radiation, because more light may be introduced into the optical image storage device. It is also possible to use a greater number of lower-quality but less expensive light sources. This is possible because light radiation from multiple directions offers a larger total radiation area. Light-emitting diodes are preferably used as light sources. Investigations by the applicant have shown that in this way, a cost-benefit optimum may be achieved. This embodiment described herein is particularly suitable for generating light effects that are built into one another, for example by using different wavelengths for the respective optical reference wave field.

A preferred configuration of the method of the invention, which is an alternative to this, contemplates that the first angular offset is located between the first irradiation surface and the emission side and that at least a second optical reference wave field is generated that is radiated onto at least a second irradiation surface, and that the second irradiation surface and the emission side, which serves as a shared emission side, are oriented parallel to one another. The second reference wave field is thus radiated onto the optical image storage device in the normal direction to the shared emission side. As was also the case with the embodiment described above, the first angular offset is preferably 90° with respect to the shared emission side. Furthermore, as described above, the light is preferably radiated onto the optical image storage device orthogonally to the respective irradiation surface.

The advantage of this embodiment is that it is particularly easy to integrate different image effects into one another, with the generation of these effects depending on the respective direction of radiation. In this way, different image effects may be integrated into each other that may also be manufactured with the same wavelength of the respective optical reference wave field. For example, an image effect may then be quickly and easily switched to another image effect by radiating the first optical reference wave field and the second optical reference wave field into the optical image storage device via the respective irradiation surface at a time offset. Of course, the embodiment described here may also be combined with the embodiment described above by generating at least three optical reference wave fields and supplying them to the optical image storage device.

An additional preferred configuration of the method of the invention procedure contemplates that a beam path of the first reference wave field and/or second reference wave field is influenced by a reflector and/or collimating optics unit and/or a light guide.

In this way, the radiation of the respective reference wave field into the respective radiation area may be advantageously made more efficient. For example, the number of light sources used may be reduced if the light from an illumination means is directed toward the irradiation surface in a more targeted and loss-free manner.

Another preferred configuration of the method of the invention contemplates that the optical image storage device comprises at least a first substrate layer having the first irradiation surface and the second irradiation surface. Of course, a plurality of substrate layers may also be furnished, for example as a base layer and top layer for an area that contains the structures for transforming the optical reference wave fields into image wave fields.

This affords many advantages, for example the structure of the optical image storage device becomes more robust against mechanical external influences. This may be achieved, for example, by increasing stiffness or protecting the structures to transform the reference wave fields into image wave fields by means of the substrate layer.

Another advantage is that one or more irradiation surfaces may be produced on the substrate layer, which may thus be flexibly and easily adapted to different requirements. This also offers advantages with regard to preparing the optical image storage device. This is particularly the case when the diffractive optical element or hologram is in the form of a foil. Of course, the hologram or diffractive optical element may also be manufactured directly on or in the substrate layer.

An additional aspect of the present invention relates to an illumination arrangement for a vehicle, comprising at least:
   a first light source for generating at least a first optical reference wave field;
   an optical image storage device having at least a first irradiation surface and at least a holographic layer or diffractive optical layer, as well as an emission side; and
   means for directing the first optical reference wave field toward the optical image storage device.

The invention contemplates that a first angular offset is located between the first irradiation surface and the emission side.

The illumination arrangement according to the invention serves in particular to carry out the above-described method according to the invention. The technical characteristics disclosed with regard to the method apply analogously to the illumination arrangement, and vice versa. The same applies to the described advantages that arise from the respective technical characteristics.

Advantageously, the illumination arrangement according to the invention is particularly easy to adapt flexibly to existing installation space conditions. In addition, the arrangement has a particularly low structural complexity.

A preferred configuration of the illumination arrangement of the invention contemplates that the arrangement comprises at least a second light source for generating at least a second optical reference wave field, or else the first light source is designed for this purpose; and that the optical image storage device additionally has a second irradiation surface and is designed so as to transform the first and second optical reference wave fields into the first image wave field or into different image wave fields.

The first light source may, for example, be designed to generate the second optical reference wave field by being coupled to a beam splitter, light guide or the like.

An additional preferred configuration of the illumination arrangement of the invention contemplates that the first angular offset is between the first irradiation surface and the emission side, and that the optical image storage device has a second irradiation surface; there is a second angular offset between the second irradiation surface and the emission side, which serves as a shared emission side.

Another alternative preferred configuration of the illumination arrangement of the invention contemplates that the first angular offset exists between the first irradiation surface and the emission side, and that the optical image storage device has a second irradiation surface oriented parallel to the emission side that serves as a shared emission side.

As long as at least three radiation areas are furnished, this embodiment may of course be combined with the embodiment described above. Another preferred configuration of the illumination arrangement of the invention comprises a reflector for deflecting the second reference wave field and/or a collimating optics unit for rectifying the second reference wave field.

Another preferred configuration of the illumination arrangement of the invention contemplates that the illumination arrangement comprises a light guide for directing the first reference wave field toward the first irradiation surface. In this context, the term "light guide" comprises all technical means that contribute to supplying the first reference wave field to the first irradiation surface with as little loss as possible. In the simplest case, it may simply take the form of a corresponding mounting position of a light source relative to the irradiation surface. This requires suitable fastening means, which the person of skill in the art selects independently. In that case, for example, an additional cover may be furnished. Of course, a lens or a light guide in the proper sense, such as a glass fiber light guide, may also be furnished.

Another preferred configuration of the illumination arrangement of the invention contemplates that the optical image storage device comprises at least a first substrate layer having the first irradiation surface and the second irradiation surface.

Another preferred configuration of the illumination arrangement of the invention contemplates that the optical image storage device comprises at least a first substrate layer having the first irradiation surface and the second irradiation surface and further comprises a second substrate layer, with the holographic layer or diffractive optical layer arranged between the first and second substrate layers. For example, the first radiation area may be furnished on the side of the first substrate layer and the second radiation area may be furnished at the rear of the first substrate layer. In this case, "rear" means parallel to the shared emission side. However, the second irradiation surface may also be furnished on the side of the first substrate layer, as in the case the first irradiation surface.

The second substrate layer affords the advantage that the holographic layer or diffractive optical layer is protected against harmful environmental influences. Another advantage is that by manufacturing the respective irradiation surfaces on the first substrate layer, it is possible to easily and flexibly realize different embodiments of the illumination arrangement. A third aspect of the invention relates to a motor vehicle comprising at least one illumination arrangement according to the invention, as described above.

As in the case of the method and illumination arrangement of the invention, the technical characteristics of the motor vehicle according to the invention and its advantages may be applied analogously to the method and illumination arrangement, and vice versa.

Preferably, the illumination arrangement according to the invention is fully or partially integrated into one or more rear lamps, lenses, brake lights or body components. The person of skill in the art is independently capable of implementing additional embodiments with regard to integrating the illumination arrangement according to the invention into a motor vehicle.

Unless otherwise stated in a specific case, the various embodiments of the invention mentioned in this application may advantageously be combined with one another.

In the following, exemplary embodiments of the invention are described with reference to the associated drawings. The drawings show the following.

BRIEF DESCRIPTION OF THE SEVERAL VIEWS OF THE DRAWING

DESCRIPTION OF THE INVENTION

Identical reference signs in the drawings denote identical technical characteristics. In addition, any statement about a reference sign in the following description applies to all drawings in which that reference sign is used, at least as a supplement, unless otherwise stated for individual drawings.

Figure 1A:
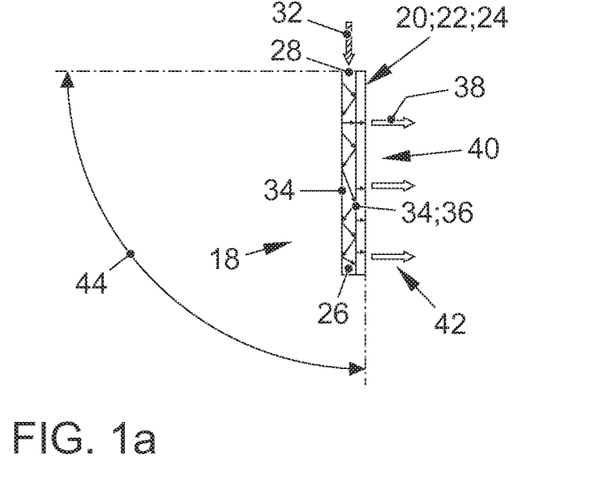
FIGS. 1a, 1b, 1c, 2a, 2b, 3a, and 3b are schematic views of various preferred embodiments of the method according to the invention.

FIG. 1a shows a first preferred embodiment of the method according to the invention for generating image effects 10 in an interior 12 (not otherwise shown) of a vehicle 14 (not shown). Because the image effects 10 may also be generated outside the vehicle 14, an environmental system 16 surrounding the vehicle 14 (not shown) is also merely implied (compare FIG. 1b).

FIG. 1a shows an optical image storage device 18. The optical image storage device 18 may comprise a holographic layer 20 or a diffractive optical element 22. In the present example, purely by way of example, a holographic layer 20 is assumed. The holographic layer 20 in this case takes the form of a foil 24. The foil 24 is applied on a first substrate layer 26. A first irradiation surface 28 is furnished to the side of the first substrate layer 26.

Figure 2A:
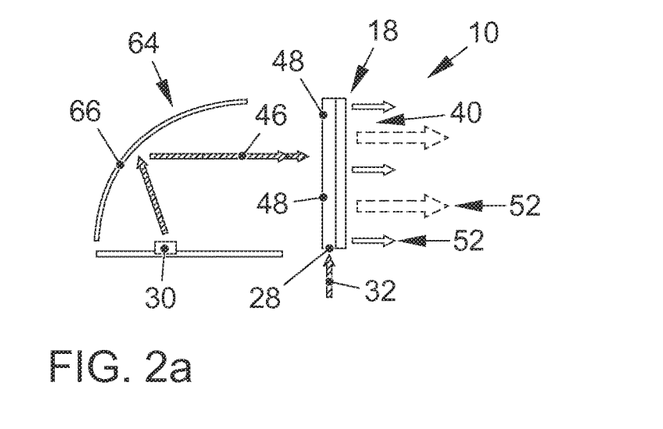

In a first step, a first optical reference wave field 32 is generated using a light source 30 not shown here (compare, for example, FIG. 2); in a second step, it is directed toward the optical image storage device 18. In a third step, the first optical reference wave field 32 is radiated onto the first irradiation surface 28. The first optical reference wave field 28 thus passes through the first irradiation surface 28 and then propagates inside the first substrate layer 26. Propagation takes place as a result of the first reference wave field 32 being reflected at inner boundary surfaces 34 of the first substrate layer 26. An inner boundary surface 36 that is oriented toward the foil 24 has partially light-transmissive properties and thus always allows a part of the optical reference wave field 32 to pass through it. The optical reference wave field 32 thus reaches the foil 24 or holographic layer 20.

In a fourth step, the first optical reference wave field 32 is transformed into a first image wave field 38 in the holographic layer 20.

In a fifth step, the first image wave field 38 is then outcoupled from the holographic layer 20 or the foil 24 on an emission side 40. The first image wave field 38 is then perceptible as an image effect 42.

It is apparent from FIG. 1a that there is a first angular offset 44 between the first irradiation surface 28 and the emission side 40. This is illustrated in the drawing by dotted extensions of the first irradiation surface 28 and the emission side 40.

The light source 30, not shown, may for example be arranged in front of the first irradiation surface 28, and the first image wave field 38 may be outcoupled substantially orthogonally (corresponding to the first angular offset 44)

from the optical image storage device 18 without the need for additional technical means for deflecting the first optical reference wave field 32 outside the optical image storage device 18. Consequently, the available installation space may be used particularly efficiently.

Figure 1B:
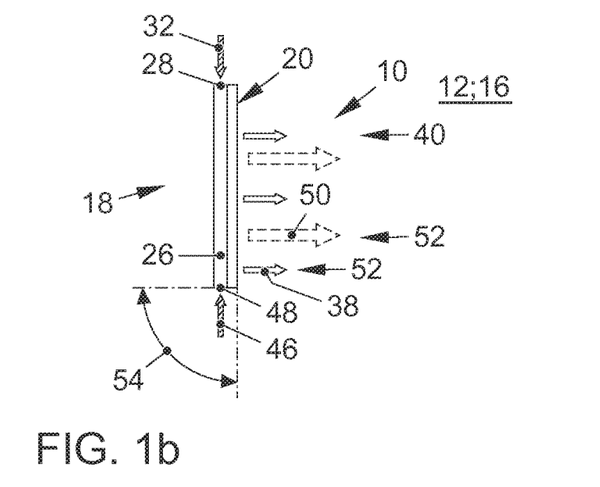

FIG. 1*b* shows another embodiment of the method according to the invention. A second optical reference wave field 46 is additionally generated in this case. The first substrate layer 26 has a second irradiation surface 48 that is arranged opposite the first irradiation surface 28. The first optical reference wave field 32 and the second optical reference wave field 46 are then radiated, simultaneously or time-shifted, into the optical image storage device 18 respectively via the first irradiation surface 28 and the second irradiation surface 48. Correspondingly, the first optical reference wave field 32 is transformed into the first image wave field 38 and the second optical reference wave field 46 is transformed into the second image wave field 50 either simultaneously or time-shifted. The image effects 10 are thus realized via different image wave fields 52.

The transformations of different image wave fields 52 in this case purely by way of example, take place as a result of using different wavelengths for the first optical reference wave field 32 and second optical reference wave field 46, in conjunction with a holographic layer 20 designed to transform different wavelengths into different image wave fields 52. Thus, for example, the effects described in greater detail in FIG. 3 may also be achieved. Analogously to what is shown in FIG. 1*a*, FIG. 1*b* shows a second angular offset 54 between the emission side 40, which serves as a shared emission side, and the second irradiation surface 48.

Figure 1C:
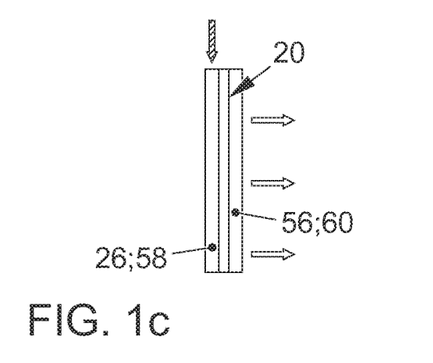

FIG. 1*c* shows another preferred embodiment of the method according to the invention, based on the embodiment from FIG. 1*a*. FIG. 1*c* shows an additional second substrate layer 56. The holographic layer 20 shown in this drawing is arranged between the first substrate layer 26 and the second substrate layer 56. These layers thus function as the base layer 58 and top layer 60.

FIG. 2*a* shows an embodiment of the method according to the invention, in which the second optical reference wave field 46 is radiated onto the second irradiation surface 48 and the second irradiation surface 48 is oriented parallel to the emission side 40, which serves as a shared emission side. As in FIG. 1*b*, different image effects 10 are also created. Purely by way of example, the same wavelength is used here for the first optical reference wave field 32 and the second optical reference wave field 46. The optical image storage device 18 transforms these into different image wave fields 52 by using the different directions from which the radiation into the respective first and second irradiation surfaces 28, 48 takes place.

Figure 2B:
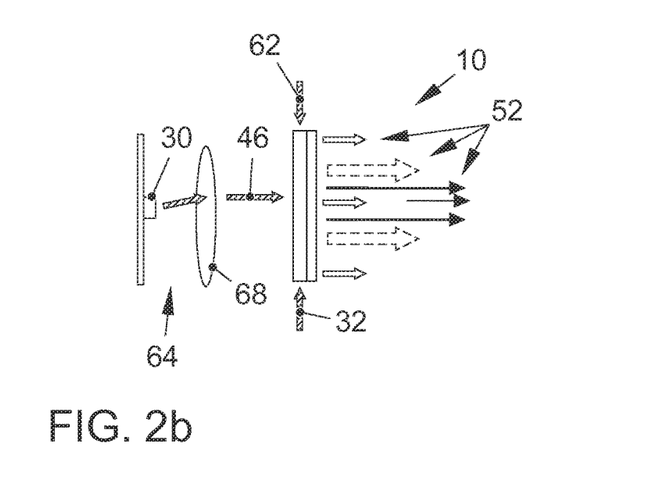

FIG. 2*b*, on the other hand, shows an embodiment of the method according to the invention, in which the first and second optical reference wave fields 32, 46 and additionally a third optical reference wave field 62 are generated. This embodiment is essentially a combination of the embodiments depicted in FIG. 2*a* and those depicted in FIG. 1*a*. The image effects 10 are realized here in the form of three different image wave fields 52. Of course, these may also be generated simultaneously or time-shifted. Expediently, the same wavelength may be used for the first and second optical reference wave fields 32, 46. A different wavelength is suitable for the third optical reference wave field 62.

The effects described in greater detail in FIG. 3, for example, may also be achieved with the embodiments shown in FIG. 2.

The technical means 64 shown in FIGS. 2*a* and 2*b* are optional and are illustrated purely for example purposes. In addition to the fasteners not otherwise shown, these means comprise, in FIG. 2*a*, a purely exemplary reflector 66, and in FIG. 2*b* also a purely exemplary collimating optics unit 68.

Figure 3A:
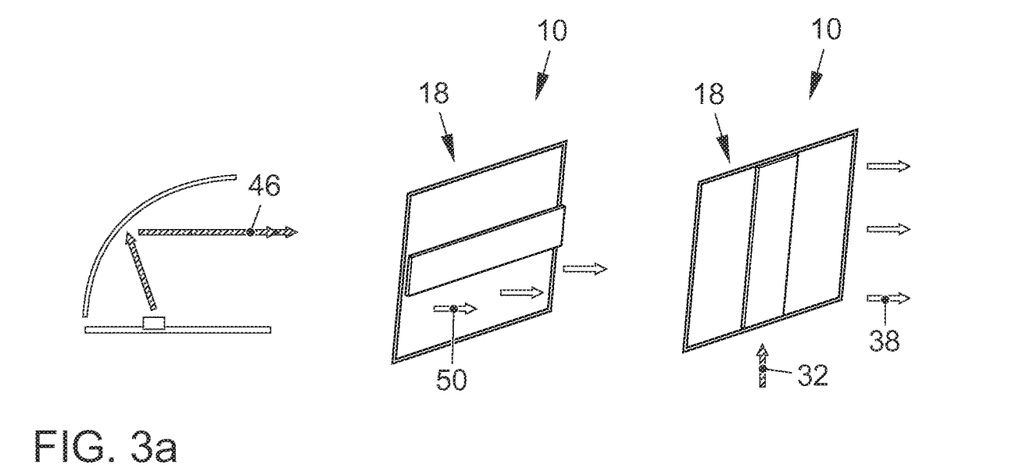
Figure 3B:
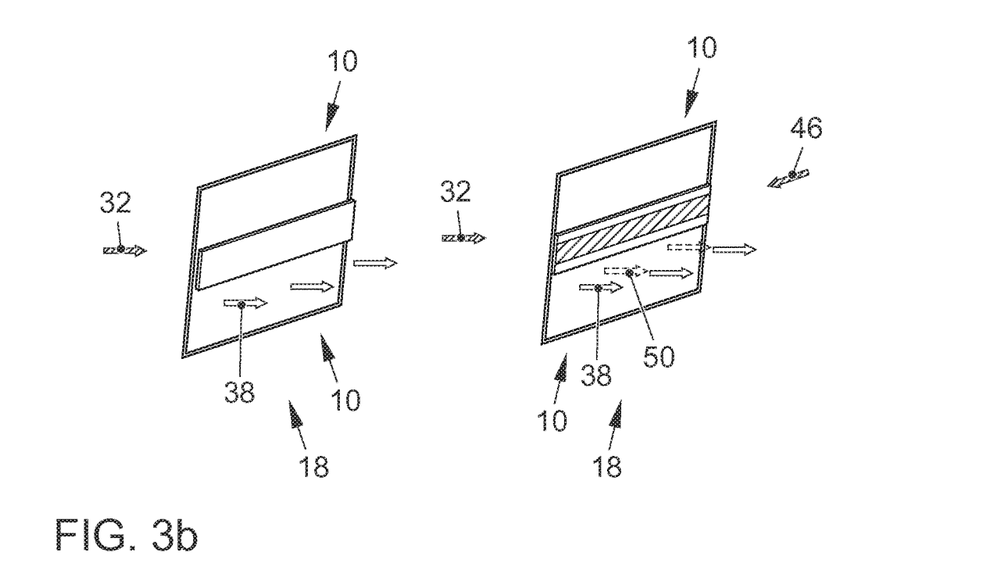

Based on the foregoing description, FIG. 3 shows two other preferred embodiments of the method according to the invention. FIG. 3*a* shows the possibility of switching back and forth between different image effects 10. FIG. 3*b* shows the possibility of integrating different image effects 10 into each other and/or to switch back and forth between them.

The right-hand portion of FIG. 3*a* shows an example of how the first optical reference wave field 32 generates the first image wave field 38. This is perceptible as an image effect in the form of a substantially vertically arranged rectangle. In contrast, the left-hand portion of FIG. 3*a* shows how the second optical reference wave field 46 generates the second image wave field 50. This field may be perceived as an image effect in the form of a substantially horizontally arranged rectangle. Both image effects 10 are generated with the same optical image storage device 18. For this purpose, the optical image storage device 18 may, for example, have structures for transforming the optical reference wave fields 32, 46 into the respective image wave field 38, 50, which function selectively depending on the respective radiation direction. By switching the optical reference wave fields 32, 46 on and off at a time offset, it possible to switch back and forth between the image effects 10.

FIG. 3*b* shows another possibility of switching back and forth between image effects 10; two image effects 10 are realized in the right-hand portion of FIG. 3*b* using the first and second image wave fields 38, 50. In contrast to FIG. 3*a*, in FIG. 3*b* image effects 10 are built into each other. In this case, for example, different wavelengths may be used for the first and second optical reference fields 38, 46 in order to distinguish the colors of the image effects 10, for example, from each other.

FIG. 4 shows two different embodiments of an illumination arrangement 70 according to the invention.

Figure 4A:
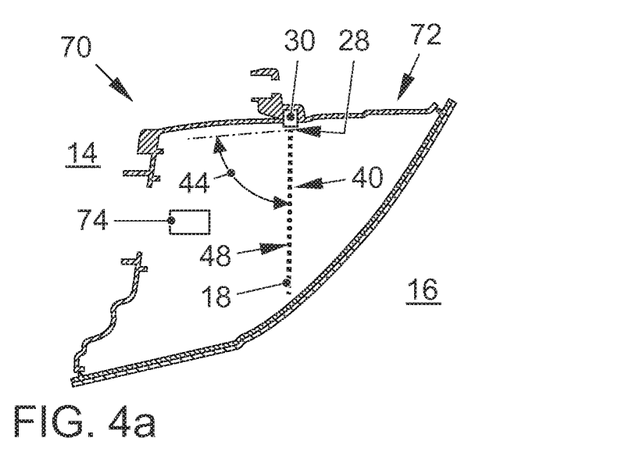
FIGS. 4a and 4b are schematic views of various preferred embodiments of the illumination arrangement according to the invention.

FIG. 4*a* shows a rear lamp 72 of a vehicle 14 not otherwise shown. Inside the rear lamp 72, a first light source 30 is arranged that is designed to generate the first optical reference wave field 32. The first light source 30 is arranged on the side of the only indicated optical image storage device 18 in front of the first irradiation surface 28. This results in a first angular offset 44 between the first irradiation surface 28 and the emission side 40. This angular offset is 90°. The illumination arrangement 70 also comprises a second light source 74. This light source is designed to generate the second optical reference wave field 46. The second irradiation surface 48 for the second optical reference wave field 46 is arranged parallel to the emission side 40, which serves as a shared emission side.

Figure 4B:
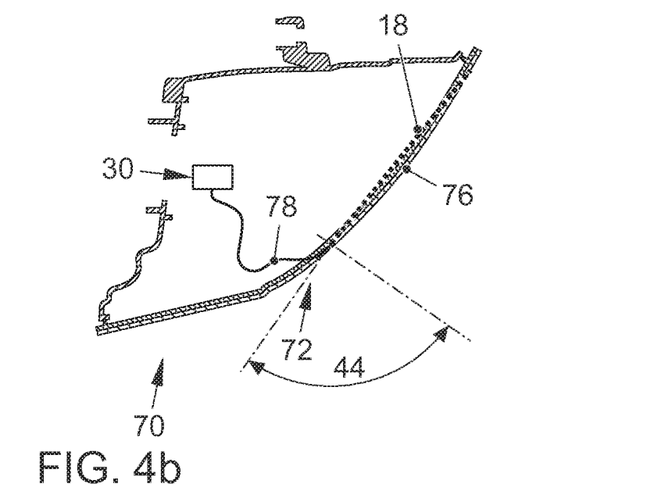

In the embodiment shown in FIG. 4*b*, the optical image storage device 18 is arranged directly behind a lens 76 of the rear lamp 72. The lateral radiation of the first optical reference wave field 32 may be realized here, starting from the first light source 30, via a light guide 78.

Figure 5:
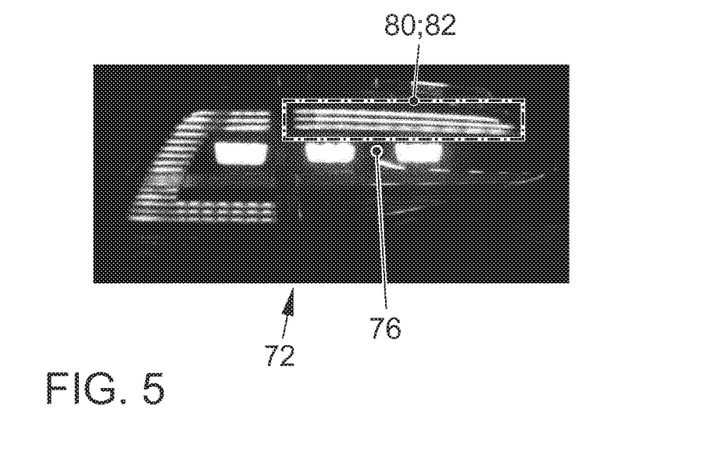
FIG. 5: An exemplary depiction of an image effect created by means of the illumination arrangement from FIG. 4, according to a preferred embodiment of a method according to the invention.

FIG. 5 shows an example of an image effect 80, which is generated with the illumination arrangement 70 from FIG. 4*b*. Here it is apparent how in the area of the actually clear lens 76, a pattern of luminous stripes running horizontally 82 is generated while the first optical reference wave field 32 is generated and transformed into the first image wave field 38. In this example, the optical image storage device 18 comprises, purely by way of example, a diffractive optical layer.

Likewise, purely by way of example, a light-emitting diode with a coherence length of 10 μm is also used as the first light source 30.

Figure 6:
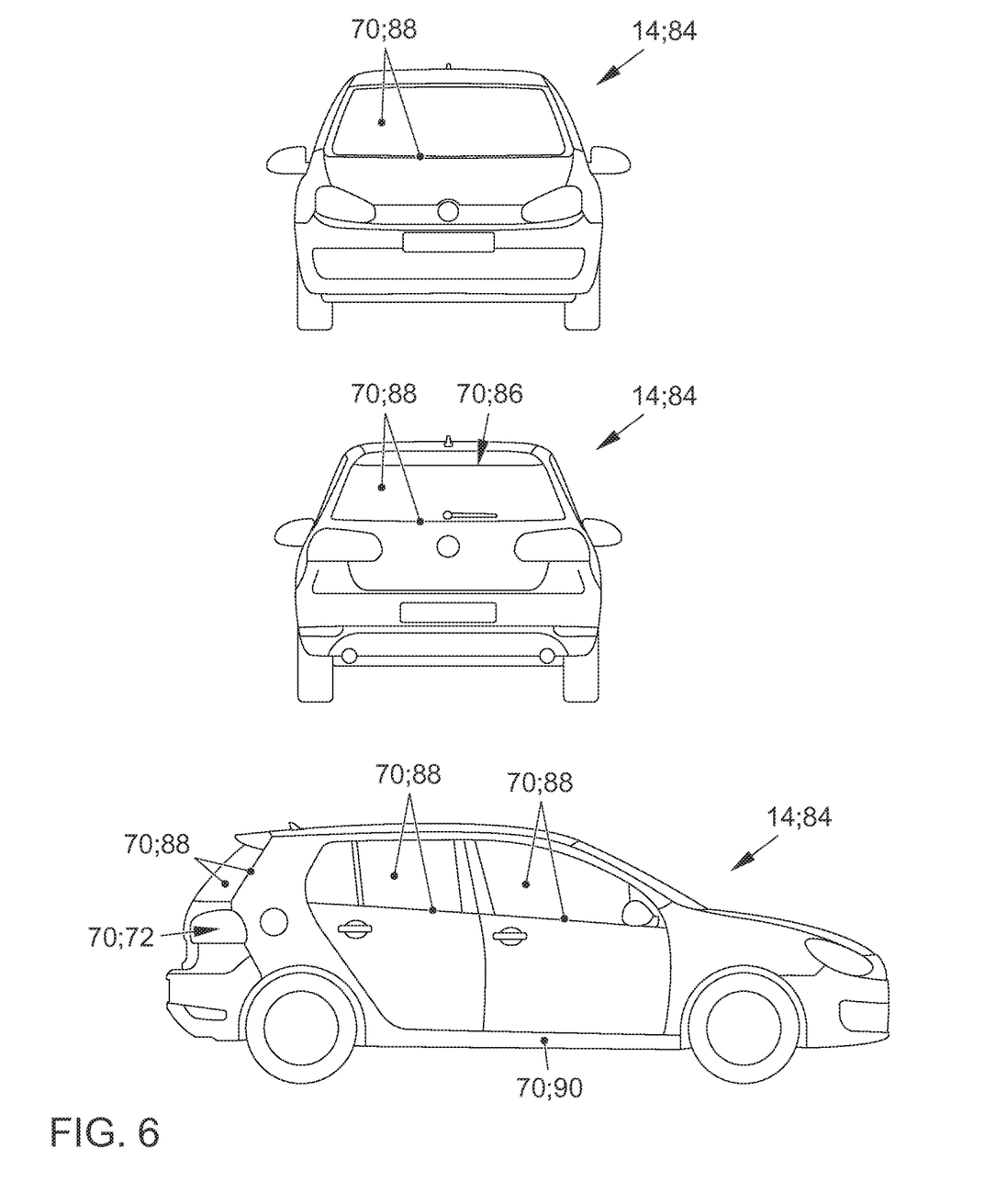
FIG. 6 is a front view, a rear view, and a side view of a motor vehicle according to the invention with an illumination arrangement according to a preferred embodiment of the invention.

FIG. 6 shows a vehicle 14 that is a motor vehicle 84 according to the invention. The motor vehicle 84 comprises at least one illumination arrangement 70 according to the invention, which is shown in different installation positions, purely as an example. For example, the illumination arrangement 70 may be integrated into the rear lamp 72 of the motor vehicle 84. However, it may also be integrated into a brake light 86 of the motor vehicle 84. In addition, the illumination arrangement 70 may be integrated into the window area 88 of the motor vehicle 84. If, for example, a volume hologram is used as optical image storage device 18, this hologram may be manufactured directly embedded in a window pane. The illumination arrangement 70 may also be arranged in the area of an automotive body part, such as a sill 90 of the motor vehicle 84. In his case, for example, the use of a diffractive optical layer 22 is recommended.

Figure 7:
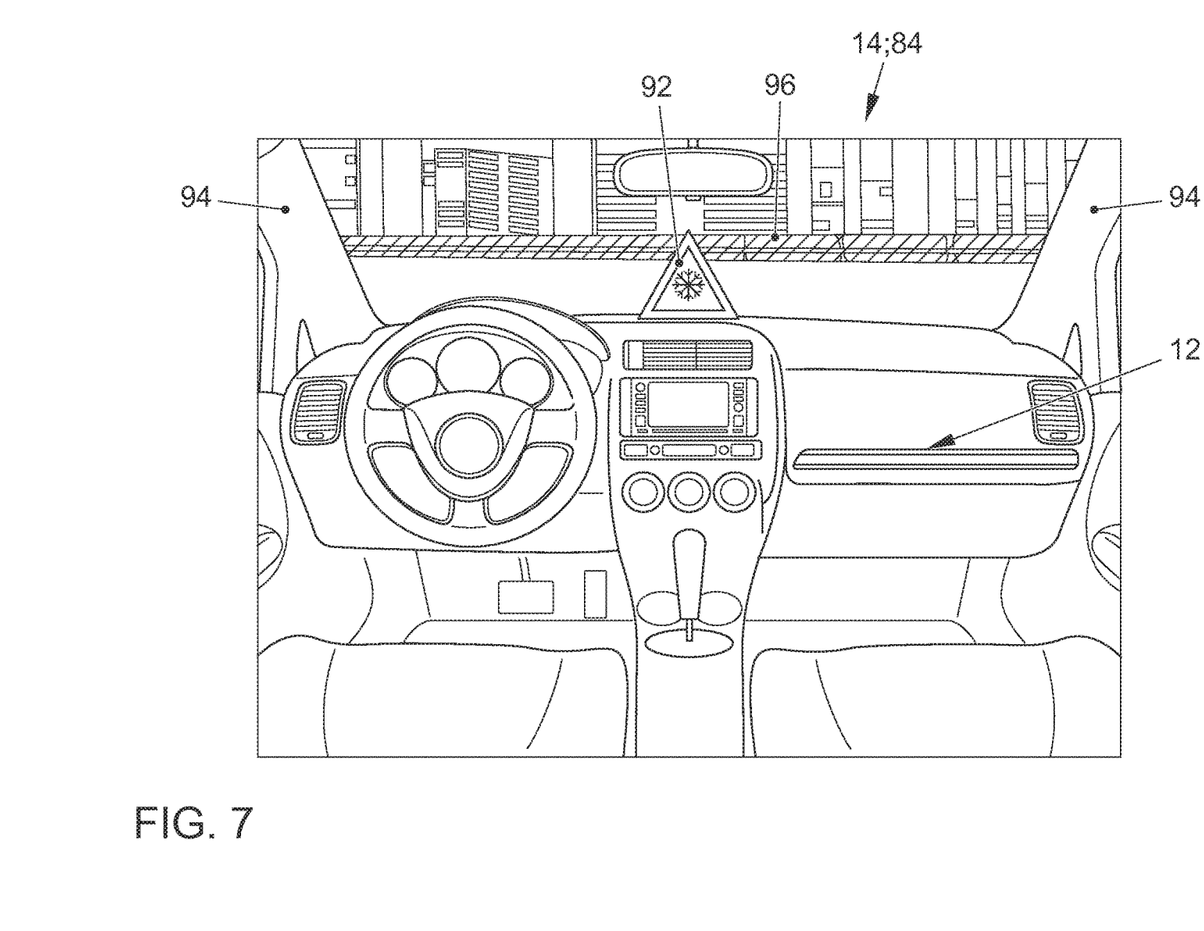
FIGS. 7-12: Various preferred examples of applications of the illumination arrangement according to the invention in a motor vehicle according to the invention in order to carry out a method according to the invention.
Figure 8:
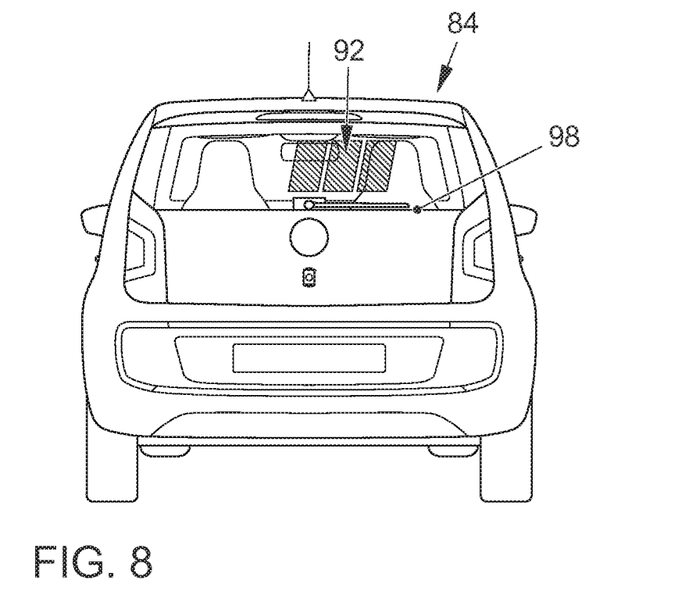

FIG. 7 shows an exemplary application, in which a volume hologram is used to generate additional symbols 92 or illuminators 94 in a windshield 96 of the motor vehicle 84. For example, the windshield 96 may be used as an inexpensive head-up display. FIG. 8 shows the generation of symbols 92 with a volume hologram in a rear window 98 of the motor vehicle 84. Purely by way of example, the drawing depicts an electrically driven motor vehicle 84. The symbols 92 show the charging status of a battery of the motor vehicle 84.

Figure 9:
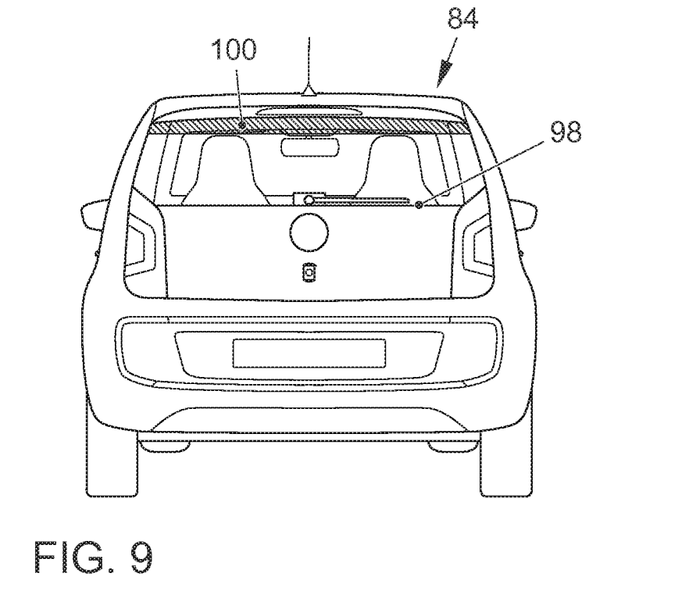

FIG. 9 shows the motor vehicle 84 from FIG. 8, with an additional third brake light 100 generated in the rear window 98.

Figure 10:
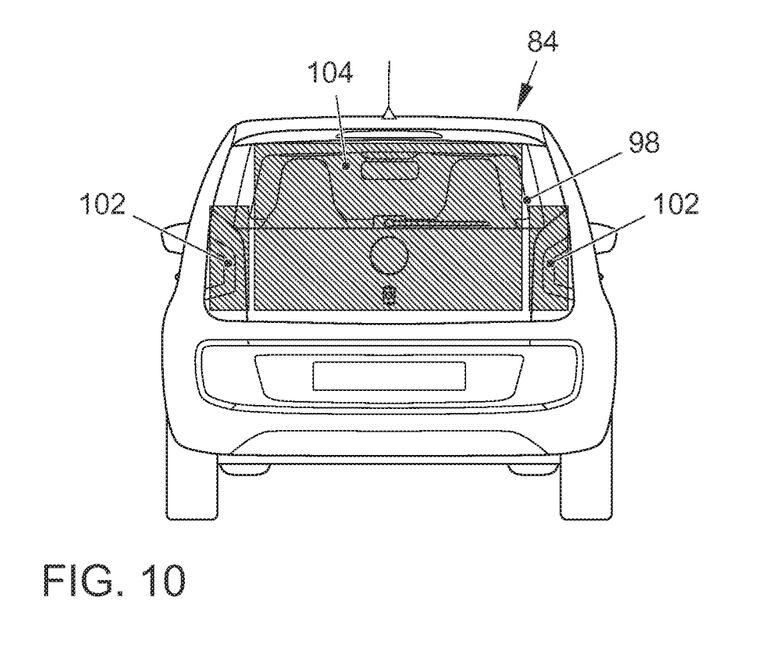

FIG. 10 shows the motor vehicle 84 from FIGS. 8 and 9, with the rear window 98 being used in this case to display entire lighting function groups, such as a combination of taillight 102 and brake light 104. Using structures for transforming reference wave fields into image wave fields as a function of radiation directions and/or wavelengths, it is also possible to switch back and forth, for example, between the effects obtained in FIGS. 8 to 10. The rear window 98 thus acquires the function of a kind of flexible display.

Figure 11:
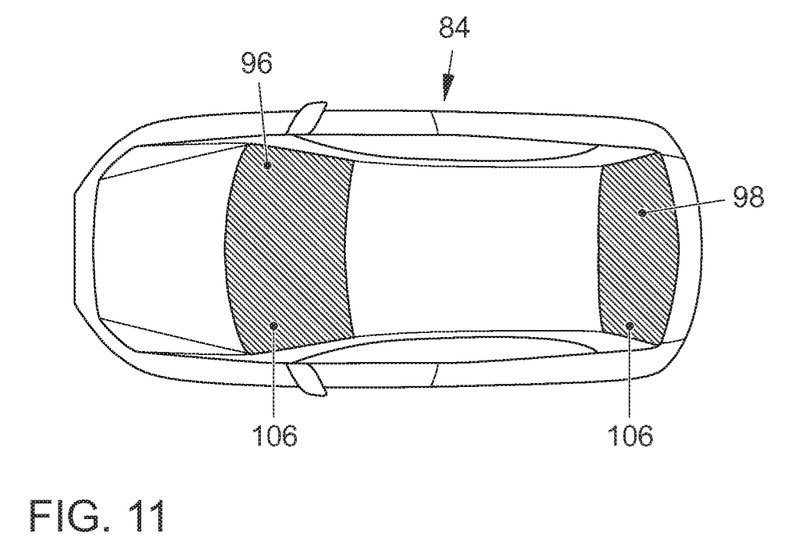

FIG. 11 shows a top view of another motor vehicle 84 according to the invention. The windshield 96 and rear window 98 of the motor vehicle 84 are used here to indicate an extended hazard light 106.

Figure 12:
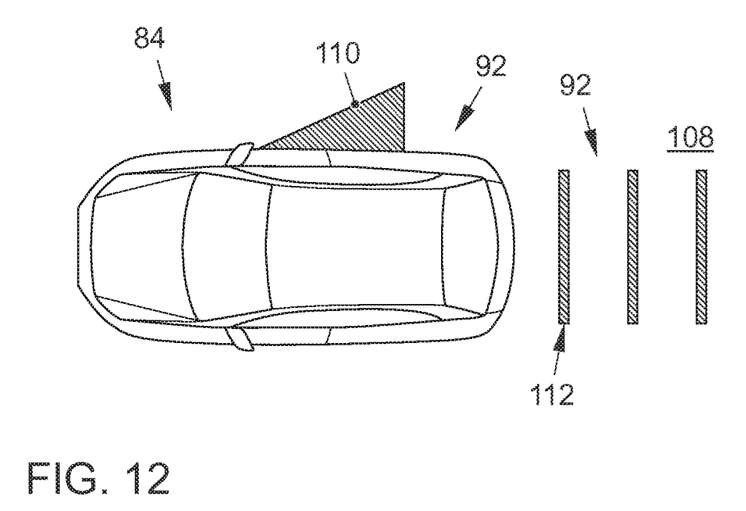

Finally, FIG. 12 shows a use case in which symbols 92 are projected onto a road surface 108, which is merely suggested in the drawing, using the optical image storage device 18, which in this case comprises a diffractive optical layer 22. The symbols 92 may, for example, represent a carpet of light 110. The carpet of light 110 may also be displayed as an animation by quickly switching between image effects. The same applies to the symbols 92, which are again depicted by way of example, in the form of spacing lines 112 to warn of following vehicles.

LIST OF REFERENCE SIGNS

10 Image effects
12 Interior
14 Vehicle
16 Environmental system
18 Optical image storage device
20 Holographic layer
22 Diffractive optical layer
24 Foil
26 First substrate layer
28 First irradiation surface
30 First light source
32 First optical reference wave field
34 Inner boundary surfaces
36 Inner boundary surface
38 First image wave field
40 Emission side
42 Image effect
44 First angular offset
46 Second optical reference wave field
48 Second irradiation surface
50 Second image wave field
52 Different image wave fields
54 Second angular offset
56 Second substrate layer
58 Base layer
60 Top layer
62 Third optical reference wave field
64 Technical means
66 Reflector
68 Collimating optics unit
70 Illumination arrangement
72 Rear lamp
74 Second light source
76 Lens
78 Light guide
80 Image effect
82 Stripe pattern
84 Motor vehicle
86 Brake light
88 Window area
90 Sill
92 Symbols
94 Illuminators
96 Windshield
98 Rear window
100 Third brake light
102 Taillight
104 Brake light
106 Extended hazard light
108 Road surface
110 Carpet of light
112 Spacing lines

The invention claimed is:

1. A method of generating image effects in an interior of a vehicle and/or outside the vehicle, the method comprising:
    generating a first optical reference wave field and a second optical reference wave field;
    directing the first optical reference wave field towards an optical image storage device, and radiating the first optical reference wave field into a first irradiation surface of the optical image storage device, and radiating the second optical reference wave field into a second irradiation surface of the optical image storage device;
    guiding the first and second optical reference wave field inside the optical storage device by reflection at inner boundary surfaces thereof, and partly radiating the first and second optical reference wave fields, at least sectionally, through an inner boundary surface of the optical storage device that faces at least one holographic layer or diffractive optical layer of the optical storage device;
    transforming the first and second optical reference wave fields simultaneously, or time-shifted, into a first image wave field or into different image wave fields by transforming the first and second optical reference wave fields into the first image wave field or into different image wave fields via the at least one holographic layer or diffractive optical layer of the optical image storage device; and emitting the first image wave field or the different image wave fields from the holographic layer or diffractive optical layer at a shared emission side;

wherein the first irradiation surface that is irradiated by the first optical reference wave field and the emission side that emits the first image wave field are angularly offset from one another by a first angular offset; and wherein the second irradiation surface that is irradiated by the second optical reference wave field and the emission side, which forms the shared emission side, are oriented parallel to one another.

2. The method according to claim 1, which comprising influencing a beam path of at least one of the first reference wave field and/or of the second reference wave field by way of at least one device selected from the group consisting of a reflector, a collimating optics unit, and a light guide.

3. The method according to claim 1, wherein the optical image storage device comprises at least a first substrate layer having the first irradiation surface and a second irradiation surface.

4. An illumination arrangement for a vehicle, the illumination arrangement comprising:

at least one light source for generating a first optical reference wave field and a second optical reference wave field;

an optical image storage device having a first irradiation surface, irradiated by the first optical reference wave field, and a second irradiation surface, irradiated by the second optical reference wave field, at least one holographic layer or diffractive optical layer, a first inner boundary surface, and a second inner boundary surface facing towards said at least one holographic layer or diffractive optical layer, and an emission side;

said optical image storage device being configured to transform the first and second optical reference wave fields into a first image wave field or into different image wave fields, either simultaneously or time-shifted, and said emission side serving as a shared emission side;

said first irradiation surface and said emission side of said optical image storage device being angularly offset from each other by a first angular offset;

said second irradiation surface and said emission side of said optical image storage device being oriented parallel to one another; and a device for directing the first optical reference wave field toward said optical image storage device; and said optical storage device being configured to guide the first optical reference wave field by reflection at said first and second inner boundary surfaces; and wherein said second inner boundary surface facing said at least one holographic layer or diffractive optical layer of said optical storage device is at least partly translucent, at least in sections thereof.

5. The illumination arrangement according to claim 4, further comprising a reflector for deflecting the second reference wave field and/or a collimating optics unit for rectifying the second reference wave field.

6. The illumination arrangement according to claim 4, further comprising a light guide for directing the first reference wave field toward said first irradiation surface.

7. The illumination arrangement according to claim 4, wherein said optical image storage device comprises at least a first substrate layer having said first irradiation surface and said second irradiation surface.

8. The illumination arrangement according to claim 4, wherein said optical image storage device comprises at least a first substrate layer formed with said first irradiation surface and a second irradiation surface and a second substrate layer, and wherein said holographic layer or said diffractive optical layer is arranged between said first and second substrate layers.

9. A motor vehicle, comprising at least one illumination arrangement for a vehicle according to claim 4.

* * * * *